United States Patent [19]

Rogers, III

[11] Patent Number: 4,952,075
[45] Date of Patent: Aug. 28, 1990

[54] LINEAR MOTION BALL BEARING ASSEMBLY

[75] Inventor: Alfred M. Rogers, III, Deer Park, N.Y.

[73] Assignee: Thomson Industries, Inc., Manhasset, N.Y.

[21] Appl. No.: 442,403

[22] Filed: Nov. 28, 1989

Related U.S. Application Data

[63] Continuation of Ser. No. 358,453, May 26, 1989, abandoned, which is a continuation-in-part of Ser. No. 174,746, Mar. 29, 1988, abandoned.

[51] Int. Cl.$^5$ ............................................. F16C 31/06
[52] U.S. Cl. .................................................. 384/43
[58] Field of Search ............................ 384/43, 44, 45; 464/168

[56] References Cited

U.S. PATENT DOCUMENTS

| | | | |
|---|---|---|---|
| 3,545,826 | 12/1970 | Magee et al. | 384/43 |
| 3,751,121 | 8/1973 | Geffner | 384/43 |
| 3,900,233 | 8/1975 | Thomson | 384/43 |
| 3,951,472 | 4/1976 | Schurger et al. | 384/43 |
| 4,005,913 | 2/1977 | Thomson, Jr. | 384/43 |
| 4,082,374 | 4/1978 | Ernst et al. | 384/43 |
| 4,120,538 | 10/1978 | Headen | 384/43 |
| 4,128,278 | 12/1978 | Headen et al. | 384/43 |
| 4,334,716 | 6/1982 | Magee et al. | 384/43 |
| 4,512,617 | 4/1985 | Saravis et al. | 384/43 |
| 4,664,535 | 5/1987 | Mottate | 384/45 X |

FOREIGN PATENT DOCUMENTS

3139934  4/1983  Fed. Rep. of Germany ........ 384/43

Primary Examiner—Thomas R. Hannon
Attorney, Agent, or Firm—Morgan & Finnegan

[57] ABSTRACT

A bearing assembly mounted on a shaft provided with one or more ball conforming grooves, the bearing assembly including a bearing retainer sleeve supporting one or more ball retainers that provide recirculating ball bearing raceways, each raceway having a load-free portion and a load-bearing portion adjacent a grooved load-carrying plate, with each load-carrying plate corresponding to a shaft groove being mounted in the retainer so as to be capable of reorienting itself about the line of balls under loading between such load-carrying plate and its corresponding shaft groove. Each such load-carrying plate is mounted to the retainer sleeve so as to be capable of both tilting about the line of balls under loading and simultaneously rolling relative to the interior wall of the housing which surrounds the bearing retainer sleeve so that the load-carrying plate can both tilt about the balls when they shift laterally due to misalignment between the shaft groove and the plate groove, and, simultaneously roll along the interior housing wall to maintain essentially the same distance between the pair of cooperating grooves between which the balls travel.

18 Claims, 4 Drawing Sheets

LINEAR MOTION BALL BEARING ASSEMBLY

This is a continuation of co-pending application Ser. No. 07/358,453, filed on May 267, 1989; which is a continuation of S.N. 07/174,746, filed on Mar. 29, 1988, both now abandoned.

Background Of The Invention

1. Field of the Invention

The present invention relates generally to ball bearing assemblies, and, more particularly, to linear motion ball bearing assemblies having improved load bearing capabilities when used with shafts having ball-conforming grooves. Although the present invention is disclosed primarily with reference to an open-type linear-motion ball bearing assembly, it will be understood by those skilled in the art that the invention can be incorporated in other appropriate types of ball bearing assemblies.

2. Description of the Prior Art

There are in the prior art, many forms of ball bearing assemblies for linear motion. These assemblies generally include a bearing sleeve supporting one or more ball retainers, each ball retainer having an oval-shaped raceway of recirculating balls. Each raceway has a load-bearing portion in which the balls are in contact with a shaft and a load-free portion wherein the balls are out of contact with the shaft. Examples of such prior art ball bearing assemblies are disclosed in U.S. Pat. Nos. 3,545,826; 3,900,233 and 4,334,716.

It has previously been recognized that the load capacity of a linear motion ball bearing assembly can be significantly increased by forming one or more ball-conforming grooves in the shaft for contacting the balls when in load-bearing condition. This advantage is obtained because each ball makes generally line contact with the shaft groove rather than the essentially point contact made between a ball and a non-grooved shaft. This increased contact reduces the stress on the balls and grooves, and allows a corresponding increase in load capacity for the bearing and shaft combination. Thus, for example, for open-type bearing assemblies (such as disclosed in U.S. Pat. No. 4,334,716) the load capacity can be increased by about ⅔ over the load capacity of non-grooved shaft arrangements when two grooves are formed in the shaft opposite the two ball raceways corresponding to the primary load direction.

Despite the increased theoretical load capacity for such grooved-shaft bearing assemblies, certain practical difficulties make it impossible in many applications to actually operate at such increased load capacity for the normally accepted useful life (typically, two million inches of linear travel) For example, since it is impossible to provide precise alignment of parts, particularly as between the cooperating pairs of grooves in which the balls travel, the bearing assembly and shaft combination is subjected to additional stress when two or more bearing assemblies are coupled together and mounted to one shaft. Such misalignment can result not only from imprecision in the actual machining of the grooves, but also misalignment caused by distortions created while the bearing assemblies are being assembled and mounted onto the shaft.

When more than one bearing assembly is used on a single grooved shaft, misalignment between the ball-conforming groove on the shaft and the grooves on the corresponding load-carrying bearing plates tend to cause the balls to ride up along the walls of the grooves. This results in increased stress on these parts.

As a result of misalignment in such bearing assembly and shaft combinations, the specified operating load capacity must be substantially down-rated from its theoretical load capacity to allow for the increased stress. For example, for a two-bearing per trackway and grooved-shaft combination using known bearing assemblies, the specified operating load capacity would be down-rated by approximately 20% from the theoretical load capacity calculated on the basis of the presence of the grooves. The reduction would be even greater (up to almost 40%) when more bearing assemblies are combined on the same shaft.

When misalignment occurs in multi-shaft arrangements, such as bearing assemblies which support a machine tool carriage on a pair of shafts, an additional disadvantage is suffered In such arrangements, misalignment of grooves not only causes increased stress as described above, but it also creates a leveling problem for the carriage assembly. Thus, as the ball bearings move up the walls of misaligned grooves, the corresponding side of the carriage tends to be lifted slightly. As a result, not only do the balls wear out prematurely from the increased stress, but also inaccuracies are introduced into the machining function carried out by the tool supported by the carriage.

Accordingly, it is an object of the present invention to provide a new and improved ball bearing assembly for use with a grooved shaft. It is also an object of the invention to provide a new and improved linear motion ball bearing assembly and grooved shaft combination.

It is another object of the present invention to provide a new and improved linear motion ball bearing assembly for use with grooved shafts which will enable operation at a higher rated load capacity than heretofore achieved in grooved shaft bearing assemblies. It is also an object of the invention to provide a linear motion ball bearing assembly which will enable operation at loading levels substantially close to the theoretical increased load capacities calculated for bearings used on a grooved shaft.

It is also an object of the invention to provide a new and improved linear motion ball bearing assembly and grooved shaft combination which will operate at a higher rated load capacity than heretofore achieved where two or more bearings are mounted to a grooved shaft. It is a further object of the invention to provide such a ball bearing assembly and shaft combination, which will come substantially close to operating at the predicted increased load capacities for grooved-shaft arrangements.

It is yet another object of the present invention to provide a new and improved linear motion ball bearing assembly and grooved shaft combination for use with carriage assemblies for machine tools. It is a particular object of this invention to provide a linear motion ball bearing assembly and grooved shaft combination for use with carriage assemblies for machine tools, which will provide virtually completely level operation of the machine tool.

It is still a further object of the present invention to provide a new and improved linear motion ball bearing assembly and grooved shaft combination, wherein the shaft can be formed by any advantageous or cost effective method, such as by forming the shaft grooves by mounting hardened or heat-treated strips into a shaft otherwise comprised of non-treated material (such as disclosed in U.S. Pat. No. 3,900,233).

Still another object of the present invention is to provide a new and improved linear motion ball bearing assembly and grooved shaft combination which can be incorporated in open-type bearings wherein the principal loading is applied in specific directions as well as any other appropriate type of bearing assembly in which the advantage of increased load capacity resulting from a grooved shaft is desired.

Still a further object of the present invention is to provide a new and improved linear motion ball bearing assembly and grooved shaft combination, wherein the balls within each bearing retainer circuit can be easily and accurately assembled in proper alignment with respect to both the load-carrying plate of the bearing assembly and the ball-conforming grooves formed in the shaft, and will automatically maintain proper alignment during operation.

The foregoing as well as certain additional objects and advantages of the invention are specifically set forth in this specification, and, at least in part, will either be readily apparent herefrom or may be learned by practice with the invention, such as can be realized and attained by means of the structures and combinations pointed out in the appended claims. Accordingly, the present invention consists of the novel parts, constructions, arrangements and combinations disclosed and claimed herein.

Summary of the Invention

Briefly described, the linear motion ball bearing assembly according to the present invention, in its broadest aspects, comprises a bearing assembly adapted to be mounted to a shaft provided with one or more ball-conforming grooves, the bearing assembly including a bearing retainer sleeve supporting one or more ball retainers that provide recirculating ball bearing raceways, each raceway having a load-free portion and a load-bearing portion adjacent a grooved load-carrying plate, with each load-carrying plate corresponding to a shaft groove being mounted in the retainer so as to be capable of reorienting itself about the line of balls under loading between such load-carrying plate and its corresponding shaft groove. Advantageously and as preferably embodied, each such load-carrying plate is mounted to the retainer sleeve so as to be capable of both tilting about the aforesaid line of balls under loading and simultaneously rolling relative to the interior wall of the housing which surrounds the bearing retainer sleeve, so that the load-carrying plate can both "tilt" about the balls when they shift laterally due to misalignment between the shaft groove and the plate groove, and, simultaneously "roll" along the interior housing wall to maintain essentially the same distance between the pair of cooperating grooves between which the balls travel.

As preferably embodied, the bearing retainer sleeve is formed from a moldable material (such as a thermoplastic material), while the load-bearing plate is formed from hardened metal and has its ball-conforming groove extending longitudinally of its interior facing surface. Advantageously, the curvature of the exterior surface of each load-bearing plate in accordance with the invention is less than the curvature of the interior wall of the housing against which it abuts when the bearing assembly is fully assembled and mounted to the grooved shaft. Advantageously and as preferably embodied, the radius of curvature of the rounded exterior plate surface is concentric with the radius of curvature of the interior ball-conforming groove on the plate. Also according to the invention and primarily for purposes of accurately locating parts during assembly and installation of the bearing assembly, a pair of elongate resilient inserts are positioned between the sides of each plate and the adjacent side walls of the opening in the bearing retainer sleeve in which the plate is mounted.

It will be understood from the foregoing summary description of the present invention that the objects and advantages of the invention specifically enumerated herein will be achieved by the invention as disclosed in the present specification.

Thus, for example, by providing a load-carrying plate capable of tilting about the line of balls in the ball-conforming shaft groove and simultanously rolling about interior surface of the housing for the bearing assembly, the balls under loading will be free to move laterally in response to any misalignment between cooperating ball-conforming grooves substantially without increasing the stress on the balls. In particular, because of the tilting/rolling capability according to the present invention, the load-bearing plate will tilt about the line of balls under loading so that the balls will remain substantially within the deepest part of the shaft groove rather than ride up the sidewalls of the groove. In addition, because the plate also "rolls" about the interior surface of the bearing housing, the distance between the portions of the shaft groove and bearing-plate groove which contact the balls remains substantially unchanged so as not to result in increased stress that would otherwise occur by the tendency to compress the balls.

Because of the tilting/rolling capability according to the present invention, the balls will maintain substantially the same amount of contact with the grooves as they would had there been perfect alignment between the corresponding grooves. The bearing assembly and grooved-shaft combination will thus experience virtually no increase in stress due to misalignment between the ball conforming grooves in the shaft and plate. It will, therefore, be able to come substantially close to operating at the theoretical maximum load capacity based on the incorporation of the shaft grooves for applications wherein the operating load capacity would otherwise have to be down-rated to allow for increased stress caused by misalignment.

The balls will also remain the same distance to the housing. Thus, when used with machine tool carriage assemblies, the present invention will virtually eliminate the possibility of leveling problems because the lifting effect otherwise caused by the balls riding up the walls of the ball-conforming shaft grooves is avoided.

It will also be found that because the inwardly facing groove on the load-carrying plate and the exterior surface of the load-carrying plate are concentric, the thickness of the load-bearing plate between the balls and the interior housing wall will remain constant to provide uniform loading on the plate regardless of any reorientation by the plate to accommodate any misalignment.

It will be understood by those skilled in the art that the foregoing general description as well as the following detailed description are exemplary and explanatory of the invention but are not intended to be restrictive thereof. Therefore, those skilled in the art will recognize that variations and modifications may be made in the specific embodiments described and disclosed herein without departing from the scope and the spirit of the invention as defined in the claims appended hereto.

Accordingly, the accompanying drawings, referred to herein and constituting a part hereof, illustrate a preferred embodiment of the invention and, together with the description herein, serve to explain the principles of the invention.

Detailed Description Of A Preferred Embodiment

Figure 1:
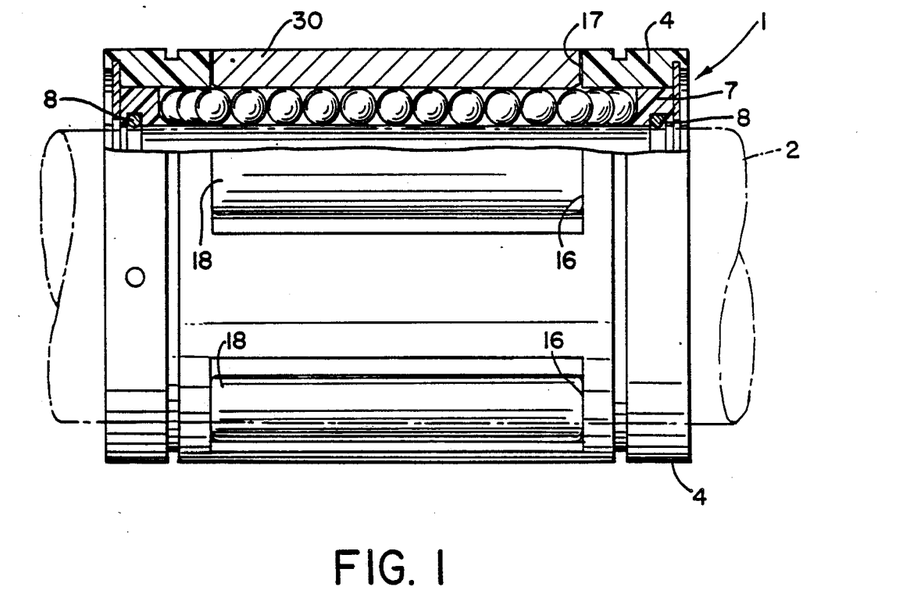
FIG. 1 is a side view with partial cut-away of an embodiment of linear motion ball bearing assembly according to the present invention.
Figure 2:
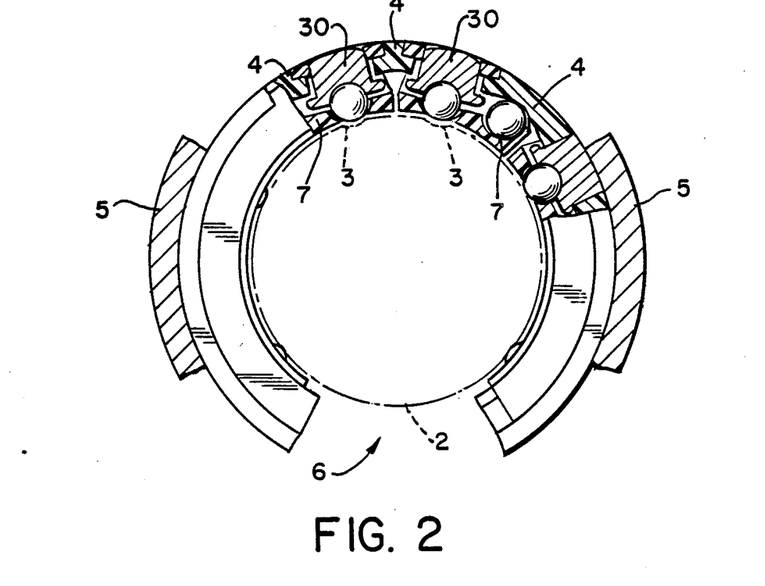
FIG. 2 is an end view, with a portion cut-away, of the linear motion ball bearing assembly shown in FIG. 1.

Referring now more particularly to the embodiment of the invention illustrated in the accompanying drawings, there is shown in FIGS. 1 and 2 a linear motion ball bearing assembly (indicated generally at 1) adapted to be used with a shaft 2 which is formed with at least one ball-conforming groove (3). The bearing assembly includes a bearing retainer sleeve 4 (also shown separately in FIG. 3) which is proportioned to fit within an appropriate housing (indicated at 5). Sleeve 4 is preferably made of plastic or other moldable material and serves as the basic structure to which the principal operative components of the bearing assembly are mounted.

Figure 3:
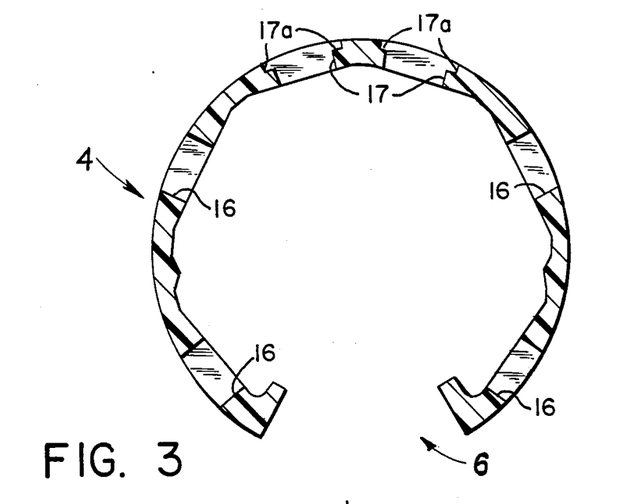
FIG. 3 is a section view of the bearing sleeve for the embodiment of the bearing assembly shown in FIG. 1.

As here embodied, the retainer sleeve 4 for the disclosed embodiment of the invention is of the open type as indicated by opening 6 at the bottom of the bearing sleeve 4 (FIGS. 2 and 3). However, as indicated above, the invention is not limited to open-type bearings, but can be applied to any other desired type of bearing in which the advantages of the invention would be useful or appropriate.

Referring to FIGS. 1, 2, 4–6 and 8–9, bearing retainer sleeve 4 supports a plurality of ball retainers, each of which is indicated at 7. Each ball retainer 7 is received in an appropriately configured opening (described hereinafter) in sleeve 4 and held in place within the sleeve by a pair of retainer rings 8. Each retainer forms an oblong, closed-loop, recirculating ball path or raceway (each indicated at 10 and best illustrated in phantom in FIG. 4) for the ball bearings 14. Except as described more specifically herein, the bearing sleeve, ball retainers, retainer rings and load-carrying plates for the disclosed embodiment are of substantially the same construction and configuration as the corresponding parts disclosed in U.S. Pat. No. 4,334,716 the disclosure of which is hereby incorporated by reference herein.

Figure 4:
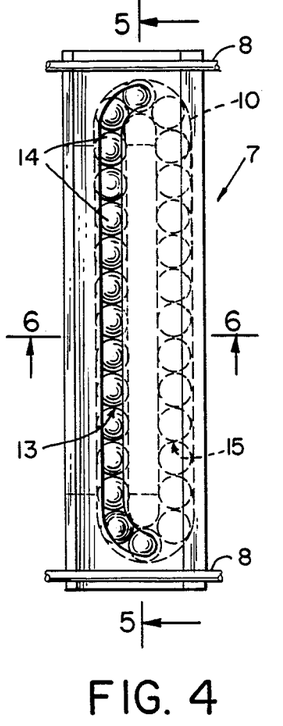
FIG. 4 is a plan view of the interior surface of a ball retainer used in the bearing assembly embodiment shown in FIG. 5 is a section view taken along section lines 5—5 of FIG. 4.
Figure 5:
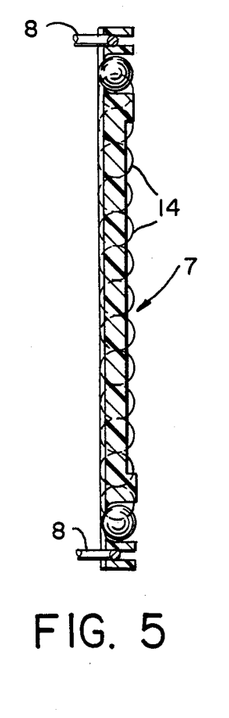
Figure 6:
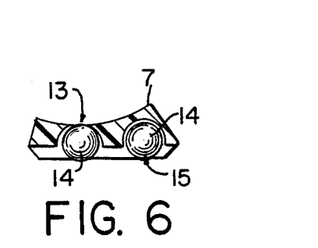
FIG. 6 is a section view taken along section lines 6—6 of FIG. 4.

Thus, each retainer 7 is proportioned to retain a plurality of balls (each indicated at 14) in each oblong raceway 10 when the bearing assembly is fully assembled. Each raceway 10 has two straight track portions, a load-bearing track portion (indicated at 13) and a non-load return track portion (indicated at 15), which are connected together by two U-shaped segments (not numbered). The retainer has an elongated opening along load-bearing track portion 13 to permit the balls 14 to protrude partially through the retainer and bear against shaft 2 for transmitting the load on the bearing assembly to the shaft, as shown in FIGS. 1 and 2. (Each non-load track portion 15 is closed along its interior surface portion to prevent contact between the balls and the shaft.) A load-carrying plate (18 or 30 as will be described more fully below) is mounted to bearing sleeve 4 in operative position at each load-bearing track portion 13, with the balls in each load-bearing track portion 13 held between the load-carrying plate and the shaft. The load-carrying plates, 18 or 30, are each mounted within a plate-receiving opening 16 or 17, respectively, as will also be described below.

Figure 7:
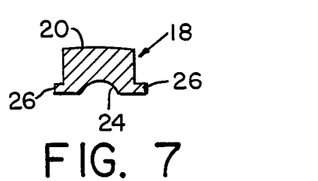
FIG. 7 is a section view of a conventional load-bearing plate which can be used in the embodiment of FIG. 1 where balls are not received in a ball-conforming shaft groove.

For bearing assembly and shaft combinations wherein the number of ball-conforming shaft grooves (3) is less than the number of ball retainers, the load-carrying plates which are not associated with a shaft groove can be of substantially conventional configuration, as indicated at 18 in FIGS. 1, 2 and 7. Each plate 18 is mounted in conventional type plate-receiving opening 16 formed in sleeve 4, such as described in the aforesaid U.S. Pat. No. 4,334,716. The outer surface 20 of each conventional load-carrying plate 18 conforms substantially to the curvature of the outer surface of sleeve 4 (as well as the interior surface of bearing housing 5). The inner surface of each plate 18 is formed with a ball-receiving groove (24) for receiving the balls 14 when under loading. Each bearing plate 18 further includes oppositely projecting flanges 26 which prevent the plate from passing through its corresponding sleeve opening 16 while the bearing assembly is being assembled or installed.

Referring now more particularly to FIGS. 1–3 and 8–10, the improvements in a ball bearing assembly and grooved shaft combination according to the present invention are illustrated in detail. According to the invention, for each ball-conforming shaft groove, the corresponding load-bearing plate (indicated generally at 30) and bearing sleeve opening (indicated generally at 17) are adapted to permit reorientation of the plate in response to misalignment between any pair of corresponding ball-conforming plate and shaft grooves.

In accordance with the invention, each bearing plate 30 and its correpsonding retainer sleeve opening 17 are proportioned to permit the plate to "tilt" about the line of balls in the load-bearing track portion 13 (i.e., about the longitudinal axis of the ball-conforming plate grooves) and, simultaneously, to "roll" relative to the interior surface of housing 5. To this end, the outer surface 32 of load-carrying plate 30 has a radius of curvature which is less than the curvature of the interior surface of housing 5. As preferably embodied, the curvature of the exterior portion 32 of bearing plate 30 is concentric with the curvature of the ball-conforming groove (34) formed on the interior surface of bearing plate 30 (as indicated by radii "a" and "b" in FIG. 10). It will be understood that the radius of curvature of ball-conforming plate groove 34 is slightly greater than the radius of its associated balls 14.

Bearing plate 30 may also be provided with oppositely projecting flanges 36 to prevent removal of the bearing plate through an opening 17 in the retainer sleeve for substantially the same reason as flanges 26 on plate 18 (FIG. 7). It will be understood by those skilled in the art that flanges 36 and bearing plate 30 are proportioned to provide sufficient clearance between the flanges and the interior surface of sleeve 4 to accommodate the desired amount of tilting/rolling movement, or reorientation, of bearing plate 30, as will be described more fully hereinafter. Those skilled in the art will similarly recognize, based on the present disclosure, that sufficient clearance should be provided between the sides of bearing plate 30 and the adjacent walls of sleeve openings 17 to allow for the desired amount of tilting/rolling of plate 30. By and large, this will be a function of the maximum allowable angular reorientation for the plate, which, in turn, will depend on the tolerances for groove misalignment designed into the bearing assembly.

Figure 8:
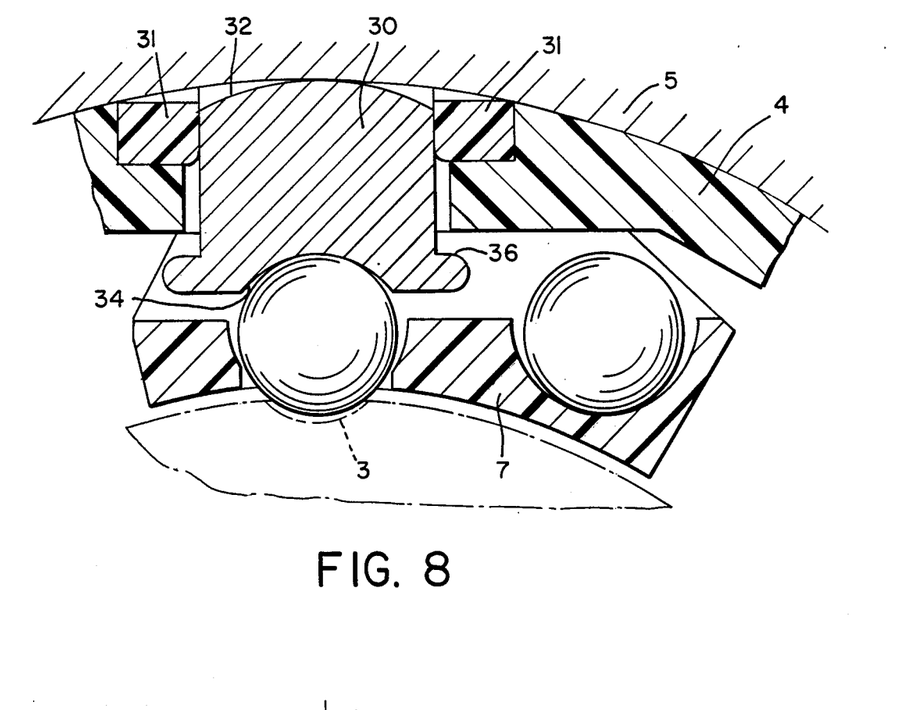
FIG. 8 is an enlarged view of part of the cut-away portion illustrated in FIG. 2, showing a particularly useful embodiment of load-carrying plate according to the present invention.
Figure 9:
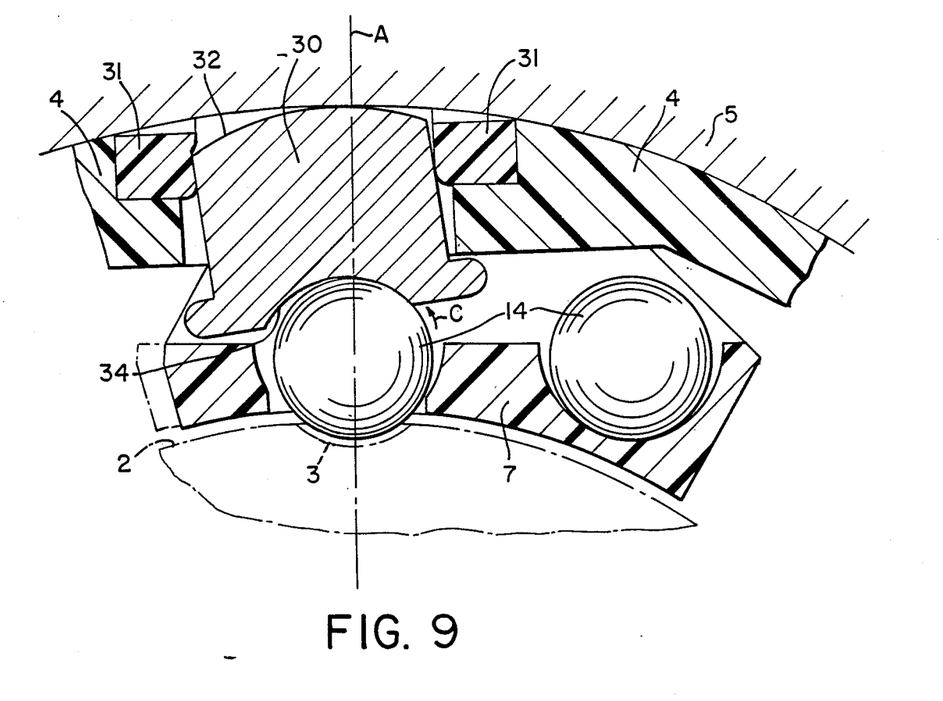
FIG. 9 is an enlarged view similar to FIG. 8, particularly illustrating reorientation of the load-carrying plate of FIG. 8, in accordance with the invention.
Figure 10:
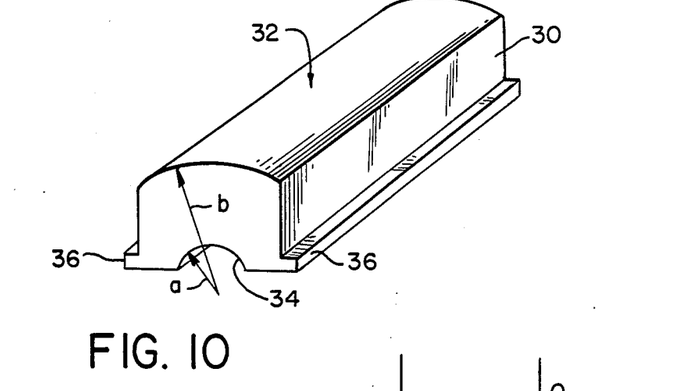
FIG. 10 is an isometric view of the embodiment of load carrying plate illustrated in FIGS. 8 and 9.

Referring now to FIGS. 8 and 9, there are shown enlarged partial cross-sectional views of the bearing assembly and grooved shaft combination according to the invention, which will serve to illustrate operation of the invention. As illustrated, the bearing assembly 1, with sleeve 4, retainer 7 and balls 14 in their oblong closed-loop raceways 10 are installed in operative position onto shaft 2 and within housing 5. In operation, the balls circulate within their oblong raceways, recirculating from the load-bearing track portion 13 wherein the balls move between ball-conforming shaft groove 3 and ball-conforming plate groove 34 to the non-load track portion 15 wherein the balls are not under loading. When misalignment is encountered between a pair of cooperating ball-conforming grooves 3 and 34, the balls tend to move laterally in response to the misalignment. (As illustrated in FIG. 9, the balls 14 shift slightly to the right.)

As best illustrated in FIG. 9, the load-bearing plate 30 according to the invention tilts about the line of balls in its load-bearing track portion 13, thereby allowing the balls to continue rolling generally within the deepest part of shaft groove 3 rather than riding up the sides of the groove. At the same time, load-bearing plate 30 rolls along the interior surface of housing 5, by which the opposite edge of plate groove 34 rises slightly (as indicated by arrow "c") to prevent any decrease in distance between the opposite groove surfaces which contact the balls. Even though the plate 30 becomes reoriented, the line of contact between the housing and the shaft remains a straight line, as indicated at A in FIG. 9, running through the center of the shaft. In addition, the distance between the ball and the housing remains constant as does its distance to the center of the shaft.

Because of the tilting/rolling motion of load-carrying plate 30, the balls are also able to maintain substantially the same amount of line contact with the adjacent ball-conforming grooves (34 and 3) as when these grooves are in precise alignment. The balls (and other bearing parts) will thus be subjected to virtually no increase in stress which would otherwise occur due to a reduction in contact. In addition, since the distance between grooves remains constant, there is also no increase in stress which would otherwise result from any additional compression forces acting on the balls. Similarly, since the balls do not ride up the walls of the grooves, the possibility of encountering a leveling problem is virtually eliminated.

Figure 11:
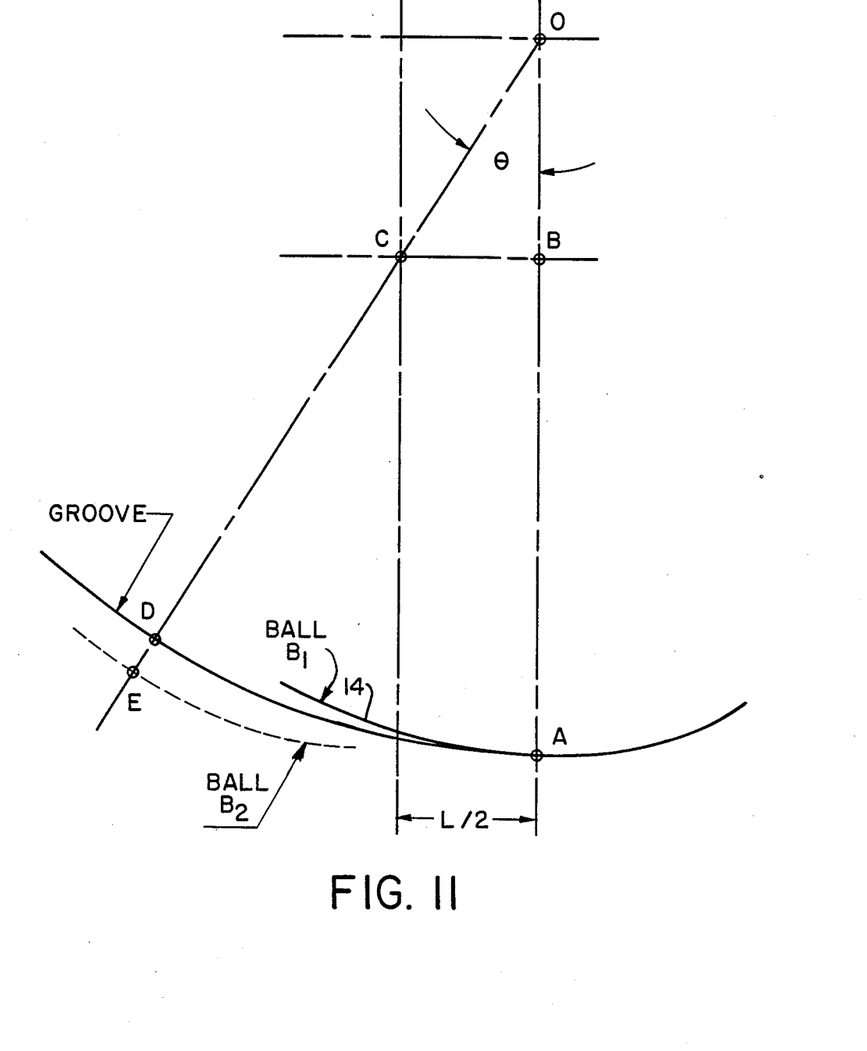
FIG. 11 is a schematic diagram illustrating how the present invention accommodates misalignment of parts.

The advantages of the present invention can also be appreciated by analyzing the movement of balls in the misaligned condition. Referring then to FIG. 11, there is shown a schematic diagram illustrating how misalignment between grooves affects the balls and grooves during operation, in the absence of the present invention.

As shown in FIG. 11, a ball-conforming shaft groove is shown with a ball 14 located at the lowest point of the groove, as indicated by BALL position $B_1$. Assuming a relative lateral displacement between grooves (to the left as shown in FIG. 11) equal to a distance L, the lateral displacement of the ball (as measured at its center) is L/2. The ball would thus tend to relocate to BALL position $B_2$. From the diagram of FIG. 11, the amount of deflection (d) which must be accommodated by way of increased stress and compression of parts can be calculated. From FIG. 11, the following geometric relations are apparent:

(1) Point O is the center of curvature of the groove.
(2) Radius of the Groove ($R_G$) = OA = OD.
(3) Radius of the ball at BALL position $B_1$ ($R_B$) = BA = CE.
(4) Lateral movement of the ball is L/2 = CB.
(5) The angle of contact of the ball with the groove at ball position $B_2$ is $\theta$.
(6) The center point of contact of the ball with the groove in the misaligned condition is point D.

From the foregoing relations, the amount of deflection, d, which must be accommodated can be calculated as follows:

$$\text{Deflection } (d) = DE = OE - OD. \quad (7)$$
$$OB = (R_G - R_B) \quad (8)$$
$$BC = L/2 \quad (9)$$

$$\theta = \text{TAN}-1\left(\frac{L}{2(R_G - R_B)}\right) \quad (10)$$

$$OC = BC/\sin\theta = L/(2 \times \sin\theta) \quad (11)$$
$$OD = OA = R_G \quad (12)$$
$$CE = R_B \quad (13)$$
$$OE = OC + CE = [L/(2 \times \sin\theta)] + R_B \quad (14)$$

Therefore, substituting equations 12 and 14 into equation 7, $$\text{Deflection } (d) = [L/(2 \times \sin -)] + R_B - R_G \quad (15)$$

By way of example, assuming a bearing assembly having balls with a diameter of 0.125 inches ($R_B = 0.0625''$) and a groove radius of 0.065" ($R_G = 0.065''$), if the relative lateral displacement of grooves is 0.001" (L=0.001"), the angle of deflection will be 11° ($\theta = 11°$) and the amount of deflection which must be accommodated due to misalignment can be calculated as 0.00012" (d=0.00012"). (It will be understood that the same amount of deflection must be accommodated on the opposite side of the ball.)

To illustrate the magnitude of the increase in stress that would act upon the balls, the normal loading on each ball in a typical ball bearing assembly of this size is approximately 40 lbf. Such a load generates a stress of approximately 345,000 psi on each ball and a normal load deflection of 0.00019 inches (i.e., in the absence of any deflection due to misalignment). Thus, the resultant cumulative stress on the balls due to a total deflection of 0.00031" (the additive sum of the normal-load deflection and deflection due to misalignment —i.e., 0.00019"+0.00012") would equal approximately 450,000 psi. This increased stress would cause early failure of the bearing and reduce its useful life by over ⅓.

Referring back to FIGS. 2–3 and 8–9, there are illustrated means for mounting the load-carrying plate 30 in the bearing assembly according to the invention. As preferably embodied, sleeve 4 is provided with a pair of oppositely disposed notch-like cut-outs (17a) on the outer portion of each sleeve opening 17 in which the load-carrying plate 30 according to the invention is installed. A resilient member (each indicated at 31) is placed within each notch-like cut-out 17a so as to retain the load-carrying plate 30 in proper location within opening 17. Advantageously, the resilient inserts 31 need only be in place during the actual assembly and installation of the bearing assembly and grooved shaft combination. Once the bearing assembly is fully assembled and mounted to the shaft within mounting housing 5, the load-carrying plates 30 will remain in place by virtue of the line of contact extending radially inwardly from housing member 5, through bearing plate 30, thence through the ball bearings 14 in the load-bearing track portion (13) and thence to the shaft 2. Therefore, it is preferred that insert members 31 are resilient so that they do not interfere with the tilting/rolling motion of load-carrying plate 30, as best indicated in FIG. 9.

Although the present invention has been described with reference to a specific bearing and shaft combination, those skilled in the art will recognize that the invention in its broader aspects is not limited to the specific embodiments disclosed and described herein. Rather, variations and departures may be made from these embodiments without departing from the principles of the invention and without sacrificing its chief advantages. Such variations and departures are thus believed to be within the scope and spirit of the invention as more particularly defined in the accompanying claims.

What is claimed:

1. A linear motion ball bearing assembly for axial movement along a shaft having at least one ball conforming groove formed on the shaft, the bearing assembly having a plurality of raceways provided by ball retainers mounted to a bearing sleeve, each said raceway having a load-bearing track portion and a load-free track portion and being substantially filled with balls which re-circulate in the raceway, with a load-carrying plate forming part of each load-bearing raceway track portion and having a ball-conforming groove for receiving balls while under loading in the load-bearing track portion, said bearing assembly characterized in that each load-bearing plate which corresponds to a ball conforming shaft groove has one ball-conforming groove formed therein and is reorientable both to tilt about the line of balls under leading and to simultaneously roll about the interior surface of the housing in which the bearing assembly is retained such that each said reorientable load-carrying plate can reorient itself to accommodate misalignment between the ball-conforming shaft groove and its corresponding ball-conforming plate groove.

2. A linear motion ball-bearing assembly according to claim 1 wherein each said reorientable load-carrying plate has a rounded exterior surface characterized in that its curvature is less than the curvature of the bearing housing in which said bearing assembly is retained.

3. A linear motion ball-bearing assembly according to claim 2 wherein the center of curvature of the exterior surface of said reorientable load-carrying plate is substantially the same as the center of curvature of the ball-conforming groove on said load-carrying plate.

4. A linear motion ball bearing assembly according to claim 1 wherein said bearing sleeve has a first opening formed therein for receiving each said reorientable loadcarrying plate, and which further includes resilient locating means positioned between each side of each said reorientable load-carrying plate and its adjacent oppositely disposed side wall portion of said first sleeve opening for retaining each said reorientable load-carrying plate in desired position and orientation during assembly and installation of said bearing assembly.

5. A linear motion ball-bearing assembly and grooved-shaft combination including a linear motion ball-bearing assembly mounted for axial movement along a shaft which has at least on ball-conforming groove formed therein, the bearing assembly having a plurality of raceways provided by ball retainers mounted to a bearing sleeve, each said raceway having a load-bearing track portion and a load-free track portion and being substantially filled with balls which recirculate within the raceway, with a load-carrying plate forming part of each load-bearing raceway track portion and having a ball-conforming groove for receiving balls while under loading in the load-bearing track portion, characterized in that each load-bearing plate which corresponds to a ball-conforming shaft groove has one ball-conforming groove formed therein and is reorientable both to tilt about the line of balls under loading in its corresponding ball-conforming shaft groove and to simultaneously roll about the interior surface of the housing in which the said bearing assembly is retained such that each said reorientable load-carrying plate can reorient itself to accommodate misalignment between the ball-conforming shaft groove and its corresponding ball-conforming plate groove.

6. A linear motion ball-bearing assembly and grooved shaft combination according to claim 5, wherein each said reorientable load-carrying plate has a rounded exterior surface which is of less curvature than that of the bearing housing in which said bearing assembly is retained.

7. A linear motion ball-bearing assembly and grooved shaft combination according to claim 6, wherein the center of curvature of the exterior surface of said reorientable loadcarrying plate is substantially the same as the center of curvature of the ball-conforming groove on said load-carrying plate.

8. A linear motion ball-bearing assembly and grooved shaft combination according to claim 6, which includes at least two said linear motion ball-bearing assemblies which are rigidly coupled together and are mounted to a single grooved shaft.

9. A ball-bearing assembly for linear motion with respect to a shaft having at least one ball-conforming groove formed therein, said bearing assembly having at least one ball raceway provided by an inner ball retainer mounted within a bearing sleeve, each said raceway having a load-bearing track portion wherein the balls are in contact with the shaft and a load-free track portion in which the balls do not contact the shaft, with a load-carrying plate mounted to the bearing sleeve to form part of each said load-bearing track portion and a ball-conforming groove formed on each load-carrying plate, said sleeve being received with a housing member, each load-carrying plate which corresponds to a ball-conforming shaft groove having only one ball-conforming groove therein and being mounted to said bearing sleeve in such manner as to be reorientable to tilt about a line of balls traveling within said shaft groove to reorient itself and accommodate misalignment between a shaft groove and its corresponding ball-conforming plate groove.

10. A ball-bearing assembly according to claim 9, wherein each reorientable load-carrying plate which corresponds to a ball-conforming shaft groove is mounted within said bearing sleeve so as to be capable of tilting about the line of balls within its corresponding ball-conforming shaft groove and, simultaneously, to roll about the interior surface of the housing in which the bearing assembly is retained.

11. A linear motion ball bearing assembly for axial movement along a shaft having at least one ball conforming groove formed on the shaft, the bearing assembly having a plurality of raceways provided by ball retainers mounted to a bearing sleeve, each said raceway having a load-bearing track portion and a loadfree track portion and being substantially filled with balls which re-circulate in the raceway, with a load-carrying plate forming part of each load-bearing raceway track portion and having a ball-conforming groove for receiving balls while under loading in the load-bearing track portion, said bearing assembly characterized in that each load-bearing plate which corresponds to a ball conforming shaft groove is reorientable to tilt about the line of balls under loading and simultaneously roll about the interior surface of the housing in which the bearing assembly is retained, each said reorientable load carrying plate having a rounded exterior surface which has a center of curvature substantially equal to the center of curvature of the ball-conforming groove on said reorientable load-carrying plate, such that each said reorientable load-carrying plate can reorient itself to accommodate misalignment between the ball-conforming shaft groove and its corresponding ball-conforming plate groove.

12. A linear motion ball-bearing assembly according to claim 11 wherein said bearing sleeve provides an open-type bearing for use with a shaft having two ball-conforming grooves positioned substantially to coincide with the primary load direction of said open-type bearing.

13. A linear motion ball bearing assembly for axial movement along a shaft having at least one ball conforming groove formed on the shaft, the bearing assembly having a plurality of raceways provided by ball retainers mounted to a bearing sleeve, each said raceway having a load-bearing track portion and a load-free track portion and being substantially filled with balls which re-circulate in the raceway, with a load-carrying plate forming part of each load-bearing raceway track portion and having a ball-conforming groove for receiving balls while under loading in the load-bearing track portion, said bearing assembly characterized in that each load-bearing plate which corresponds to a ball conforming shaft groove is reorientable to tilt about the line of balls under loading and simultaneously roll about the interior surface of the housing in which the bearing assembly is retained to permit each said reorientable load-carrying plate to reorient itself to accommodate misalignment between the ball-conforming shaft groove and its corresponding ball-conforming plate groove, said bearing sleeve having a first opening formed therein for receiving each said reorientable load-carrying plate, with resilient locating means positioned between each side of each said reorientable load-carrying plate and its adjacent oppositely disposed side wall portions of said first sleeve opening for retaining each said reorientable load-carrying plate in desired position and orientation during assembly and installation of said bearing assembly.

14. A linear motion ball-bearing assembly according to claim 13, wherein each said first opening has a notch-like recessed portion formed along opposite side walls, and which further includes a strip of generally resilient material mounted within each said notch-like recess and abutting over side reorientable load-carrying plate.

15. A linear motion ball-bearing assembly and grooved-shaft combination including a linear motion ball-bearing assembly mounted for axial movement along a shaft which has at least one ball-conforming groove formed therein, the bearing assembly having a plurality of raceways provided by ball retainers mounted to a bearing sleeve, each said raceway having a load-bearing track portion and a load-free track portion and being substantially filled with balls which recirculate within the raceway, with a load-carrying plate forming part of each load-bearing raceway track portion and having a ball-conforming groove for receiving balls while under loading in the load-bearing track portion, characterized in that each load-bearing plate which corresponds to a ballconforming shaft groove is reorientable to tilt about the line of balls under loading in its corresponding ball-conforming shaft groove and simultaneously roll about the interior surface of the housing in which the said bearing assembly is retained, each said reorientable load-carrying plate having a rounded exterior surface which has a center of curvature substantially equal to the center of curvature of the ball-conforming groove on said reorientable load-carrying plate, such that each said reorientable load-carrying plate can reorient itself to accommodate misalignment between the ball-conforming shaft groove and its corresponding ball-conforming plate groove.

16. A linear motion ball-bearing assembly and grooved shaft combination according to claim 15, wherein said bearing sleeve provides an open-type bearing and said shaft has two ball-conforming grooves positioned substantially to coincide with the primary load direction of said open-type bearing.

17. A linear motion ball-bearing assembly and grooved shaft combination according to claim 16, wherein said bearing sleeve has a first opening formed therein for receiving each said reorientable load-carrying plate, and which further includes resilient locating means positioned between each side of each said reorientable load-carrying plate and of said load-carrying plate and its adjacent oppositely disposed side wall portion of said first sleeve opening for retaining each said reorientable load-carrying plate in desired position and installation of said bearing assembly.

18. A linear motion ball-bearing assembly and grooved shaft combination according to claim 17, wherein each said first opening has a notch-like recessed portion formed along opposite side walls, and which further includes a strip of generally resilient material mounted within each said notch-like recess and abutting one side of said reorientable load-carrying plate.

* * * * *